W. W. ROBACHER.
FILTERING APPARATUS.
APPLICATION FILED MAY 13, 1910.
1,051,160.
Patented Jan. 21, 1913.
6 SHEETS—SHEET 3.
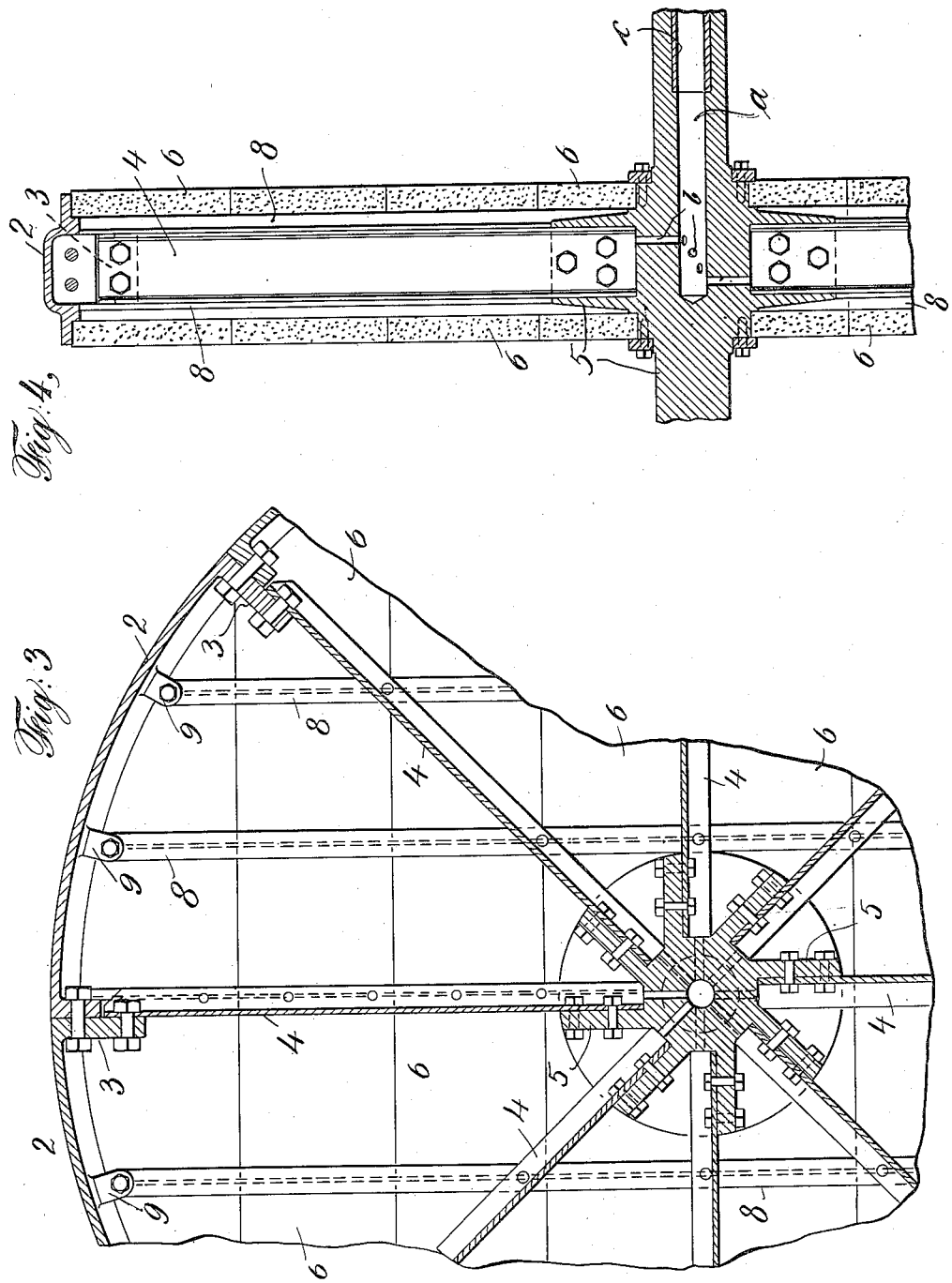

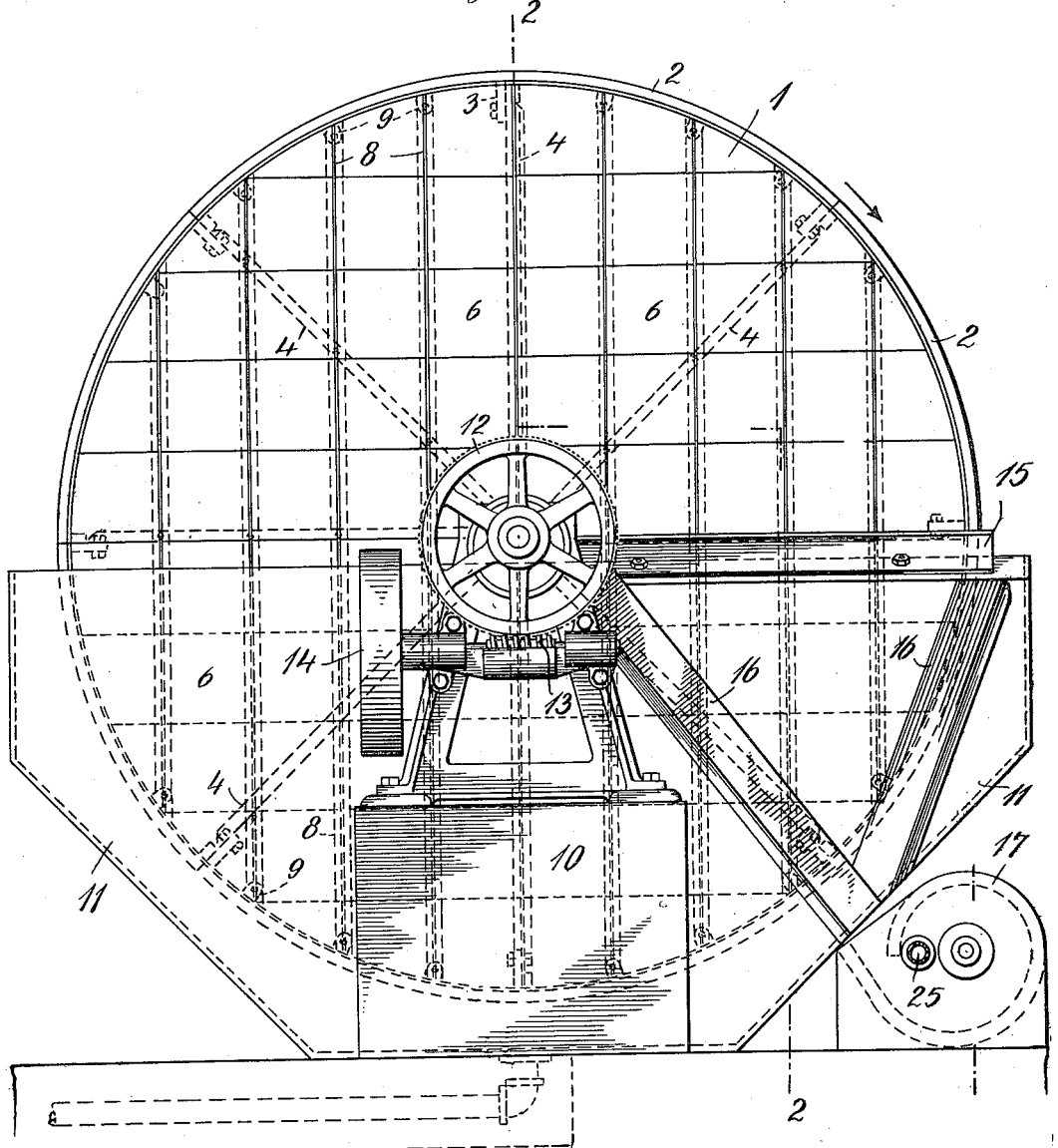

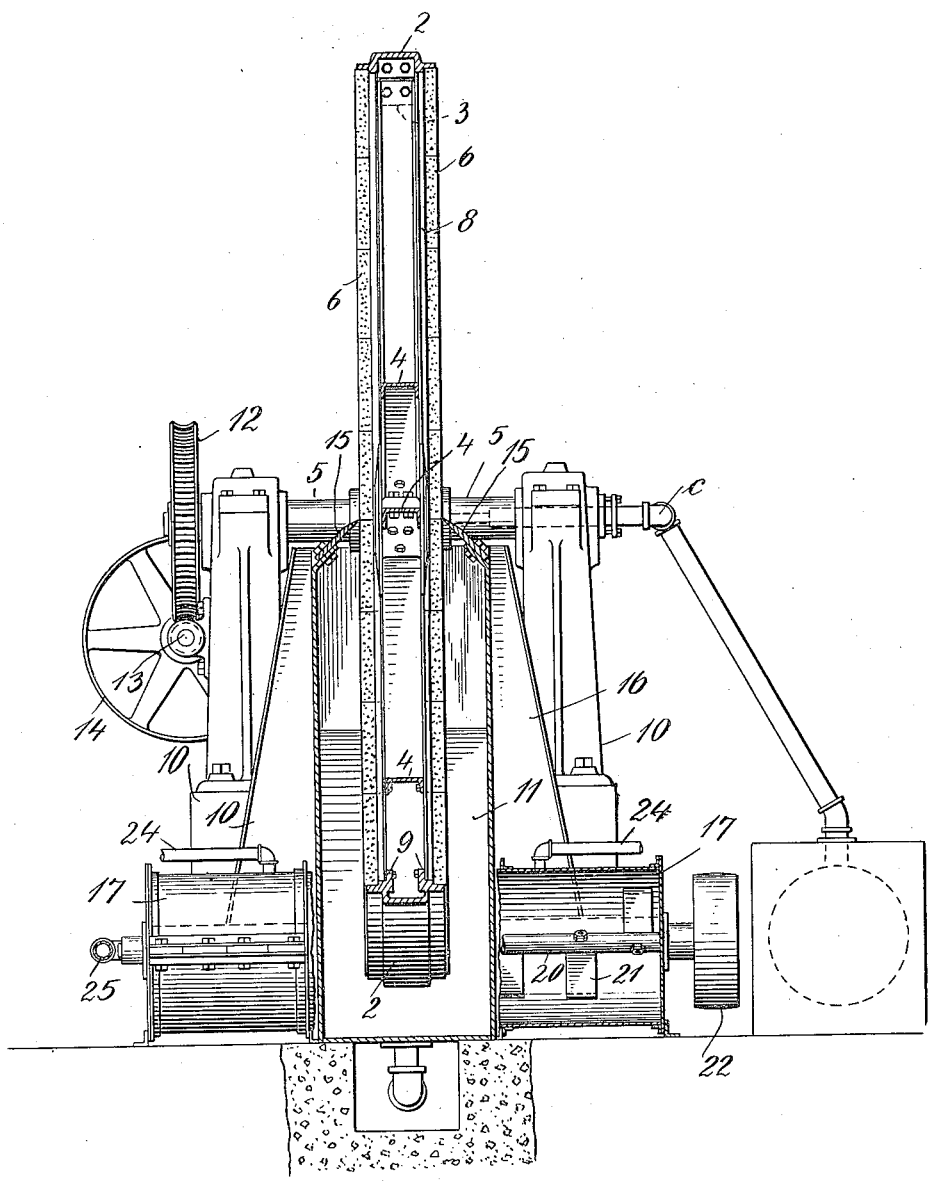

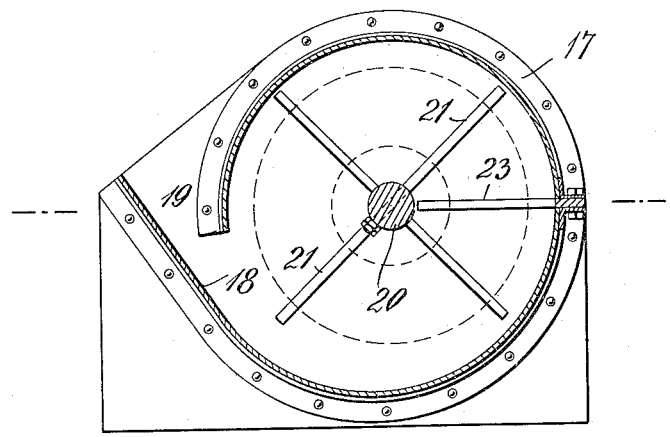
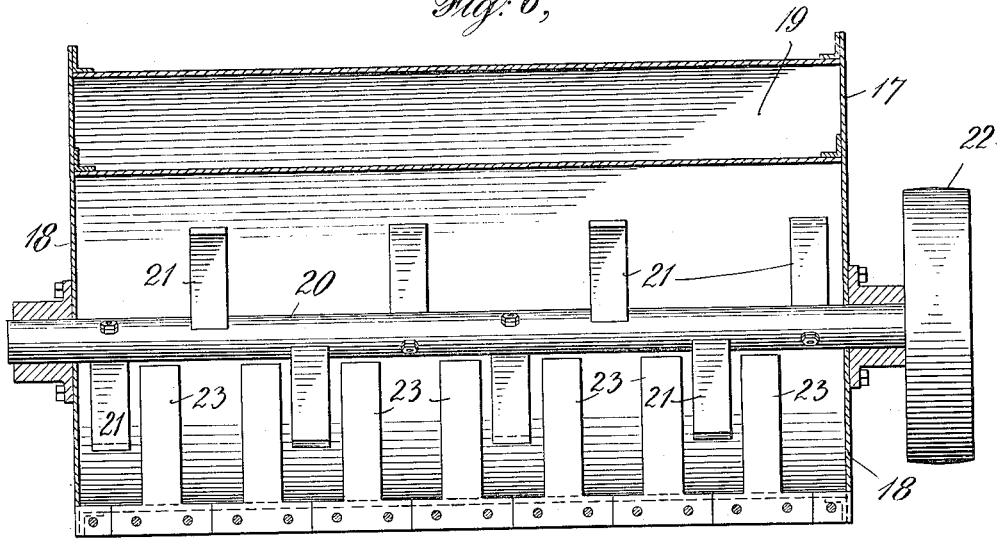

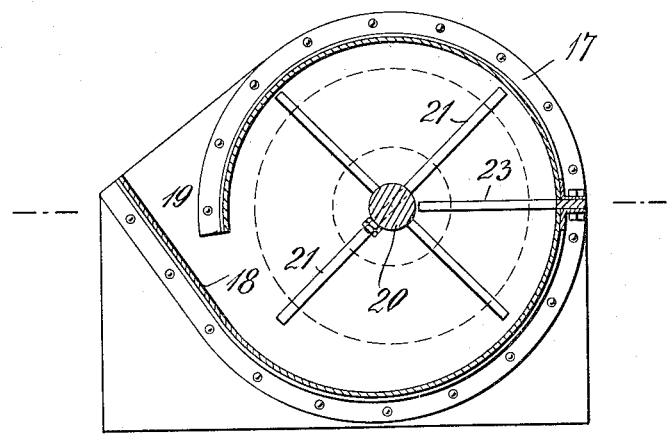
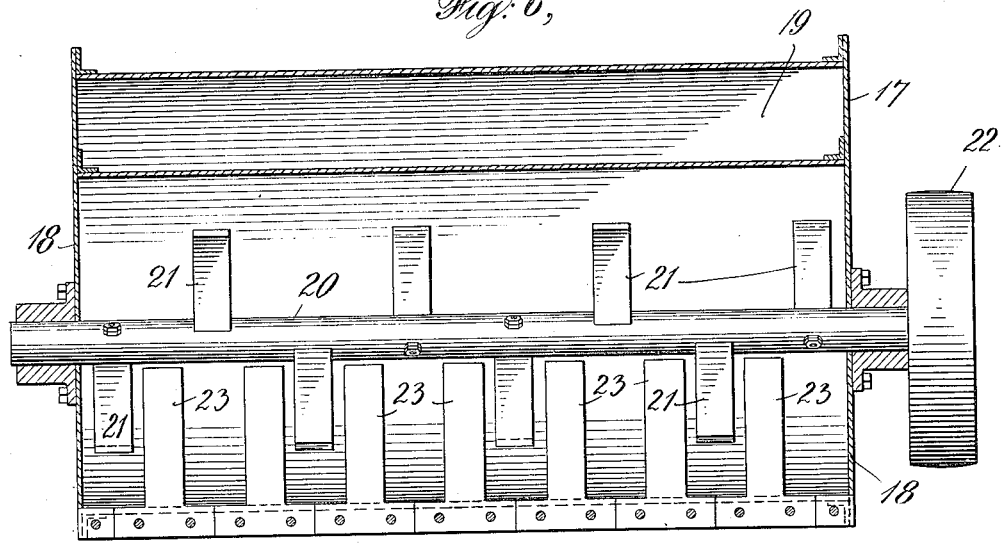

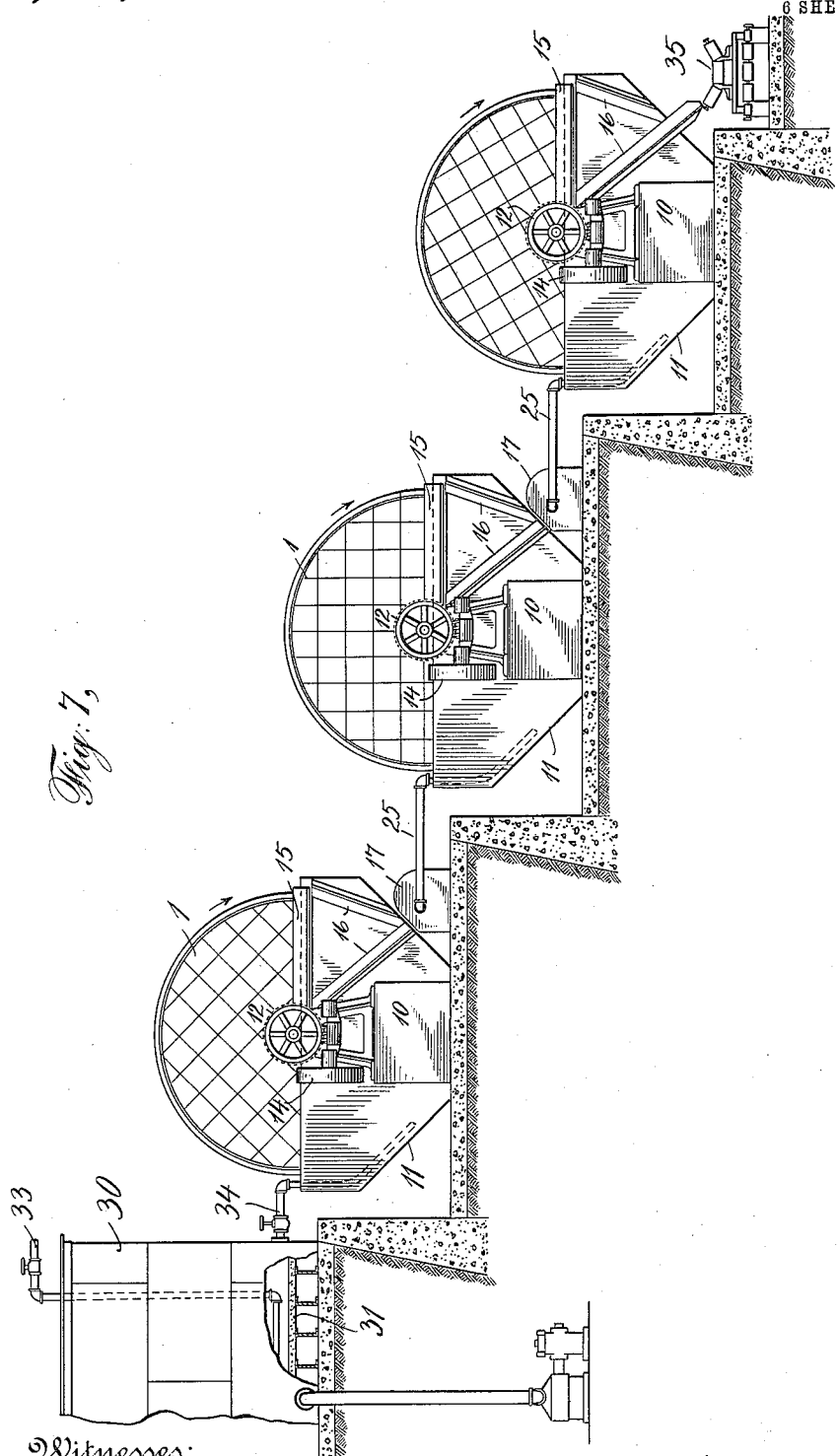

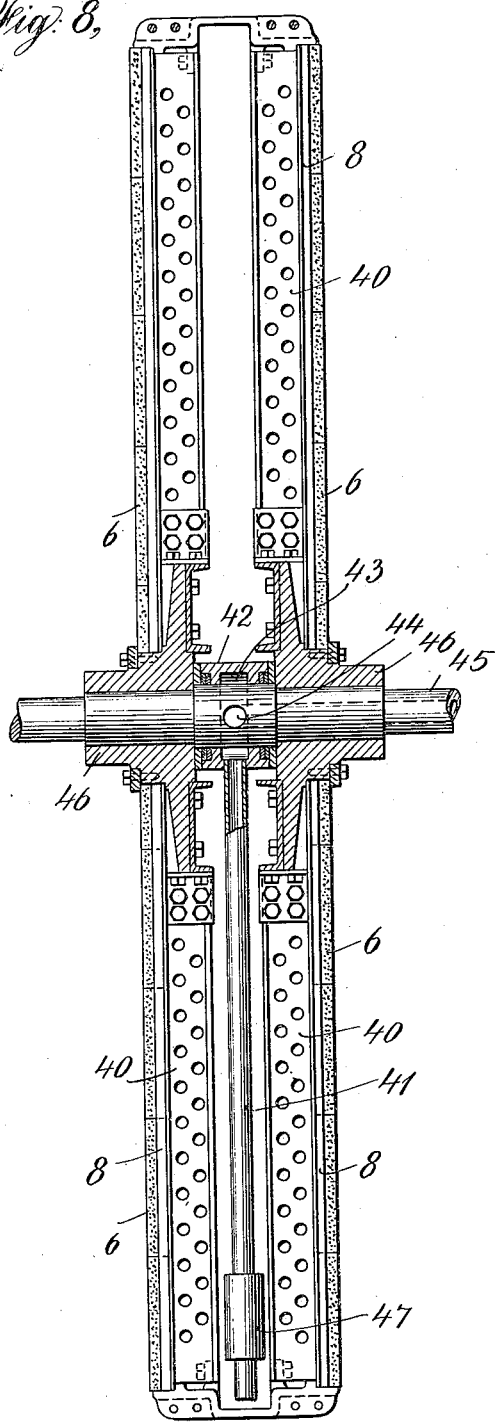

UNITED STATES PATENT OFFICE.

WILLIAM W. ROBACHER, OF ROCHESTER, NEW YORK, ASSIGNOR TO JUST PROCESS COMPANY, OF SYRACUSE, NEW YORK, A CORPORATION OF NEW YORK.

FILTERING APPARATUS.

1,051,160.  Specification of Letters Patent.  Patented Jan. 21, 1913.

Application filed May 13, 1910. Serial No. 561,043.

*To all whom it may concern:*

Be it known that I, WILLIAM W. RO-BACHER, a citizen of the United States, and a resident of Rochester, county of Monroe, and State of New York, have invented certain new and useful Improvements in Filtering Apparatus, of which the following is a specification.

This invention relates to improvements in filtering apparatus, more particularly to filters for extracting precious metals from their ores, and the objects of the invention are to provide an apparatus which will carry out a continuous extracting process in a very simple and easy manner, and which will not become clogged by the slimes collecting on the surface of the filter, and which will require little or no repairing of parts.

To the accomplishment of the above objects, and to such others as may hereinafter appear, the invention comprises in combination a rotary filter, provided with a porous mineral septum for filtering wet slimes and the like, the solution being drawn through the porous mineral septum, whereas the slimes are retained upon the surface of the porous mineral septum from which they are removed, and if desired the slimes are again wet and filtered in the same manner by a similar rotary filter, provided with a porous mineral septum, connected in series with the first mentioned filter, the slimes being treated in successive steps as often as desired.

Referring to the drawings: Figure 1 is a side elevation of a rotary filter constructed in accordance with my invention. Fig. 2 is an end elevation of the filter, the filter wheel being shown in cross section on the zig-zag line 2—2 of Fig. 1; the mixer being shown partly in cross section and partly broken away. Figs. 3 and 4 are detail views in cross section with parts broken away, of the filter wheel shown in Figs. 1 and 2. Figs. 5 and 6 are detail views in cross section of the mixer. Fig. 7 is a side view showing several rotary filters connected in series. Fig. 8 is an alternative form of filter wheel in cross section.

In the drawings, 1 designates the filtering body, which in this case has the form of a wheel which may be of any convenient size (in practice they have been made from six to twelve feet in diameter, depending upon the conditions of use; it of course being understood that the same may be made smaller or larger as desired). In the present instance the filter wheel 1 comprises a rim 2 made in sections which are bolted together by means of suitable lugs 3, to which are also secured the outer ends of channel iron spokes 4, the inner ends of which are secured to the hub 5 as shown in Figs. 3 and 4. The hub 5 of the filter wheel is bored axially at one end as shown at *a*. The hub is also bored transversely to provide holes *b* each of which provides a passageway from the hole *a* to the space between adjacent spokes, so that the filtrate may be drawn from the space between adjacent spokes out through the hole or passage *a* to the end of which is rotatably mounted a discharge pipe connection *c*. It is also to be noted that the holes *b* are spaced along the hub as shown in Fig. 4 so that when the filtrate passes into the passageway *a* from any one of the holes *b* it will not run directly into another hole *b* on the other side of the hub, but will be spattered against the sides of the passageway *a* to facilitate the withdrawal of the filtered material by means of suction applied by the pipe *c*.

In the present instance the sides of the filter wheels as above described, are each provided with a porous mineral septum 6 which for convenience and strength is advantageously made in sections, and cemented together, the same being set and held in T iron braces 8, the ends of which are secured to lugs 9, in the rim of the wheel, the braces 8 being also preferably secured to the spokes where they cross the same. It is obvious that the porous mineral septum 6 may be made of sufficient size to cover the entire side of the wheel, if so desired, but in the case of large wheels, the porous mineral septum is advantageously made in sections, as above described, to better withstand the strain to which the porous mineral septum is subject to in use. It is also obvious that it is not necessary to cover both sides of the filter wheel with a porous mineral septum as only one side may be so provided, the other side being covered by any suitable covering.

The filter wheel as above described is rotatably mounted upon suitable standards 10, the lower portion of the filter wheel being immersed in a suitable tank 11, which in the present instance is very little larger than that portion of the filter wheel which is immersed in it, although the tank may be made larger if so desired.

The filter wheel is provided with means for turning the same which, in the present instance, consists of a worm wheel 12, secured to the solid end of the hub 5, said worm wheel meshing with a worm 13 driven by a pulley 14, the filter wheel being driven in the direction of the arrow.

Suitable scrapers or cleaners 15, in the present instance, secured to the edges of the tank, are provided for removing the slimes, or other material, from the surfaces of the porous mineral septum on the sides of the filter wheel. Beneath the scrapers 15 are secured suitable guideways or chutes 16 which guide the slimes or other material, as the same is removed from the sides of the filter wheel, to the mixer 17 which, in the present instance, is arranged to receive the slimes, or other material, from both sides of the filter wheel.

The mixer 17, in the present instance, comprises a piece of sheet metal 18 bent in the shape of a cylinder and open along one side as shown at 19, to permit the slimes or other material to enter the mixer, but closed at the ends. The mixer 17 is also provided with a shaft 20, provided with paddles 21 which is driven by a pulley 22. To prevent the slimes, or other material, from forming lumps, stationary paddles 23 are provided, which are preferably placed at the side of the mixer, as shown in Figs. 5 and 6, so as not to interfere with the material entering the mixer. The mixer 17 is also provided with suitable pipes 24 by means of which water or other liquid is admitted to the mixer for mixing with the slimes or other material removed from the filter wheel. A suitable outlet such as the pipe 25 is provided for removing the wet slimes or other liquid material from the mixer after the same has become thoroughly mixed together, the pipe 25 being secured to the mixer above the bottom of the same to accomplish this purpose.

The operation of the filter wheel as above described will now be described as applied to extracting precious metals from their ores by cyaniding, reference being had to Fig. 7.

Finely ground ore mixed with a solution of cyanid is first introduced into the tank 30 provided with a porous mineral septum 31 through which air is forced by means of the air inlet pipe 32 for aerating and agitating the mass in the tank which is usually heated by means of a steam pipe 33 immersed in the tank. This method of getting the precious metals in solution being more fully described in Patents Nos. 880,821 and 887,268 granted to Porter and Clark as joint inventors. After the precious metals have been placed in solution in the tank 30 as above described, the mass is run out of the tank through the medium of the pipe 34 to the filter tank 11, which extends upward to about the center of the filter wheel 1, the tank 11 being at all times kept as full of the mass or pulp from the tank 30, as is possible without danger of overflowing. Suction is then applied to the center of the filter wheel 1 through the medium of the vacuum pipe $c$, the filter wheel being slowly rotated in the direction of the arrow through the medium of the driving pulley 14. While the suction is being applied to the center of the wheel, as above described, the cyanid solution containing the precious metals is filtered through the porous mineral septum on the sides of the filter wheel and collects in each space between the spokes 4 of the filter wheel. As each such space or pocket of the wheel is elevated by the rotation of the filter wheel to a horizontal position, the filtrate will flow by gravity to the center of the wheel and be taken off with the assistance of the vacuum through the holes or passageways $a$ and $b$, the holes $b$ as before described being arranged so as not to be in line with each other so as to spatter the liquid coming through the hole $b$ as it rises to a horizontal position to facilitate the vacuum removing the same. While the cyanid solution containing the precious metals is being removed, as above described, the slimes or material not in solution collect upon the surfaces of the porous mineral septum; and as different sections of the wheel are brought above the level of the mass or pulp in the tank 11, by the rotation of the wheel, the slimes or solid material adhering to the surfaces of such sections are dried upon the surface of the filter wheel by the action of the vacuum drawing the liquid of such slimes into the interior of the wheel.

Just before the different sections of the filter wheel are again immersed in the tank, the material adhering to the surfaces of the porous mineral septum is removed by means of the scrapers 15, as above described, about seventy to eighty per cent. of the cyanid solution originally carried by such solid material having been removed. The proportion of cyanid solution so removed can be regulated by increasing or decreasing the diameter of the filter wheel, or by varying the speed of the same, of the degree of suction used. In practice, however, the filter wheel is usually of such size and is run at such a speed that an extraction of about seventy to eighty per cent. is obtained.

The slimes or other material from which seventy to eighty per cent. of the cyanid solution containing the precious metal has been removed, and which therefore contains about twenty to thirty per cent. of cyanid solution containing precious metals, after being removed by the scrapers 15, passes, as before described, to the mixer 17, where the same is mixed with water or cyanid solution, through the medium of the pipes 24 so as to dilute the twenty to thirty per cent. of cyanid solution containing the precious metals and bring the same up to about a hundred per cent. solution, so that the slimes or other material will be of the same relative fluidity as when it entered the first filter tank 11 after leaving the tank 30.

The slimes or other material containing twenty to thirty per cent. of the precious metals in solution now diluted as above described, is allowed to pass from the first mixer 17 by means of the pipe 25 to a second filter tank 11 provided with a filter wheel similar in all respects to the one first described. Here the same operation is carried on whereby seventy to eighty per cent. of the solution is again removed, as in the first filter wheel, so that the slimes or other material removed from the second filter wheel, contain only from four to nine per cent. of the values originally in solution in tank 30, removed from the second wheel, although the same contains from twenty to thirty per cent. of moisture. From the second filter the slimes, or other material, are again treated with water or cyanid solution in a second mixer, in the same manner as they were treated in the first mixer, and the slimes or other material is run into a third filter tank provided with a filter wheel in all respects similar to the other two filter wheels, just referred to, and operated in the same manner. The slimes removed from this third filter wheel contain the same amount of moisture, as the slimes removed from the first two wheels, namely, twenty to thirty per cent., but the values in solution are usually less than one per cent. of the values originally in solution in the tank 30. The slimes removed from the third filter wheel may be passed to a fourth filter wheel and so on, but in the present instance the slimes removed from the third filter wheel are discharged onto a traveling belt 35.

While the operation of the filter wheel has been described in relation to two other similar wheels, it is of course to be understood that only one filter wheel may be used, or several used depending upon the condition of the material to be filtered and the amount of extraction required.

Instead of constructing the interior of the filter wheel as shown in Figs. 3 and 4, the same may be constructed as shown in Fig. 8, in which the spokes 40 do not extend all the way across the center of the wheel, dividing the wheel in sections, as is the case in Figs. 3 and 4, but the same are constructed in pairs so as to leave a space in the center of the wheel for the pipe 41 which is suitably mounted to an air tight free swinging collar 42, the center of which is provided with a circular recess 43 which communicates with a hole 44 connected with the hollow end of the shaft 45 which is secured to the hub 46. The pipe 41 is also preferably provided with a weight 47 so as to keep it in a vertical position when the filter wheel is rotated. From this construction it will be seen that the lower end of the pipe 41, which is open, will always hang at the bottom of the filter wheel and any filtered material or liquid which may be drawn through the porous mineral septums on each side of the filter wheel will flow to the bottom of the same and be removed, by the vacuum, through the pipe 41.

The porous mineral septum as above described, is preferably made uniformly porous so that the slimes which collect on the surface of the same will do so in a uniform manner and will accordingly be uniformly dried and of uniform thickness so as to be readily removed. The porous mineral septum is also made of sufficient thickness to properly filter the material, it being also important that the porous mineral septum should be thick enough to withstand the action of the vacuum and also the action of the scrapers or cleaners. In practice a porous mineral septum of one and a half to two inches in thickness has given good results in properly filtering the material and has had sufficient strength to withstand the pressure of the vacuum and the scrapers or cleaners.

The porous mineral septum as above described is practically indestructible and can be used indefinitely without being repaired, the same is also of such a nature that it can easily be cleaned by forcing air or water under pressure from the center of the filter wheel out through the porous mineral septum without fear of injuring the same. The porous mineral septum has the great advantage of being rigid, which permits of the slimes or other material being removed by scrapers, as above described, without fear of injuring the porous mineral septum, the scrapers being set so as to remove practically all of the slimes, or other material, from the surface of the porous mineral septum, leaving the same clean to accumulate more slimes in the further operation of the filter wheel. The porous mineral septum has also the advantage of being able to filter hot material without injury to the porous mineral septum. The porous mineral septum is also not affected by strong acids or alkalis, and can filter such material with practically no deterioration of the porous mineral septum.

While the invention has been described with particular reference to the details of construction, the same is not to be considered as limited thereto, as many changes may be made and still fall within the scope of the following claims.

In the above description and following claims, the word "side" is used as referring to the lateral surfaces of the filtering wheel and not to the peripheral surface thereof.

What I claim is:—

1. In a rotary filter a filter wheel having at least one flat side thereof made up of sections of a porous mineral septum secured to each other to form a continuous filtering wall, means for producing a difference in pressure on opposite sides of said wall, and means for removing from the surface of said wall solid material accumulating thereon.

2. In a rotary filter a rigid framework connecting the central portion thereof with the sides and periphery, said framework comprising radial imperforate spokes forming partitions dividing the interior of said wheel into a plurality of chambers, and a rigid and continuous filtering wall made up of sections of a porous mineral septum rigidly secured to said framework.

In testimony whereof I have signed this specification in the presence of two subscribing witnesses.

WILLIAM W. ROBACHER.

Witnesses:
J. EDWD. PORTER,
EDWIN E. CARPENTER.